(No Model.) 2 Sheets—Sheet 1.

E. SOUTHWORTH.
MEANS FOR TEACHING FRACTIONS.

No. 342,651. Patented May 25, 1886.

WITNESSES: C. S. Gooding. H. H. Monroe.

INVENTOR: Edward Southworth. by Wright, Brown & Crossley. Atty's.

(No Model.) 2 Sheets—Sheet 2.

E. SOUTHWORTH.
MEANS FOR TEACHING FRACTIONS.

No. 342,651. Patented May 25, 1886.

WITNESSES:
C. S. Gooding
H. H. Monroe

INVENTOR:
Edward Southworth
by Wright, Brown & Crossley
Attys.

N. PETERS, Photo-Lithographer, Washington, D. C.

UNITED STATES PATENT OFFICE.

EDWARD SOUTHWORTH, OF QUINCY, MASSACHUSETTS.

MEANS FOR TEACHING FRACTIONS.

SPECIFICATION forming part of Letters Patent No. 342,651, dated May 25, 1886.

Application filed February 8, 1886. Serial No. 191,196. (No model.)

*To all whom it may concern:*

Be it known that I, EDWARD SOUTHWORTH, of Quincy, in the county of Norfolk and State of Massachusetts, have invented new and useful Improvements in Educational Appliances, of which the following is a specification.

My invention relates to educational appliances, and particularly to that class of such contrivances designed to assist in teaching the rudimentary principles of fractions.

It is the object of my invention to provide a simple and convenient device of the character mentioned adapted to acquaint children and others beginning to study arithmetic with all of the elementary principles of the rule or science of fractions, and to make the study thereof a pleasant pastime, and in no sense a task or drudge-work.

To the foregoing ends my invention consists in a series of disks, of any suitable material, divided into independent fractional parts, the parts of each disk or block being uniform in size, in combination with an exhibitor provided with circular wells or pockets, whereby the independent fractional parts of the disks may be readily assembled to form a unit or fractional part of a unit, and be conveniently displayed before a student or class of students.

My invention also consists in the combination, with the foregoing, of means for holding or storing said sectional disks, all as hereinafter fully described, and subsequently pointed out in the claims.

Figure 1:
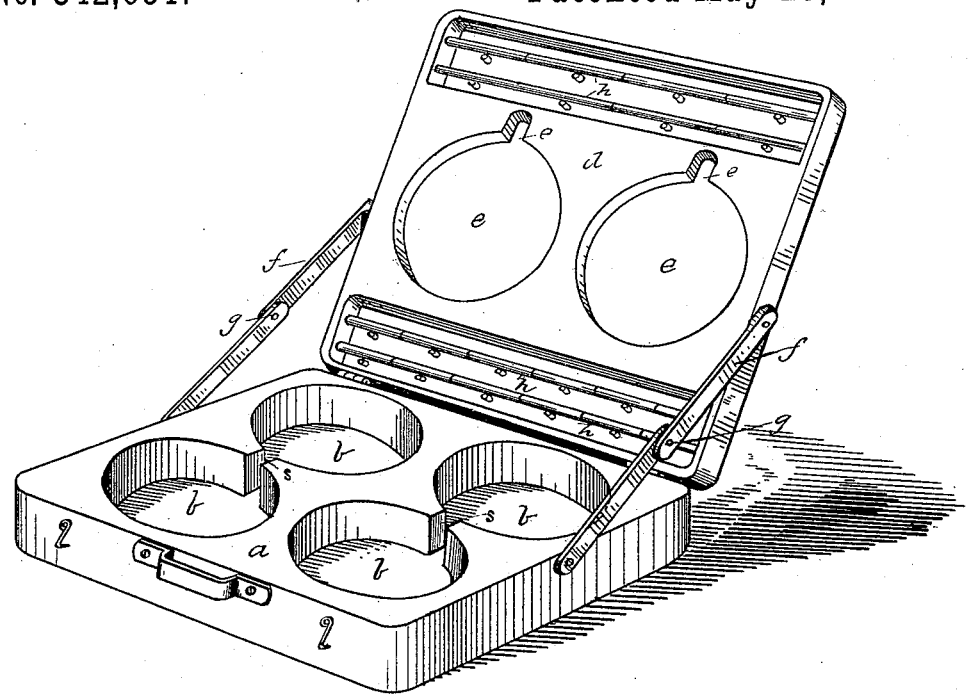
Figure 2:
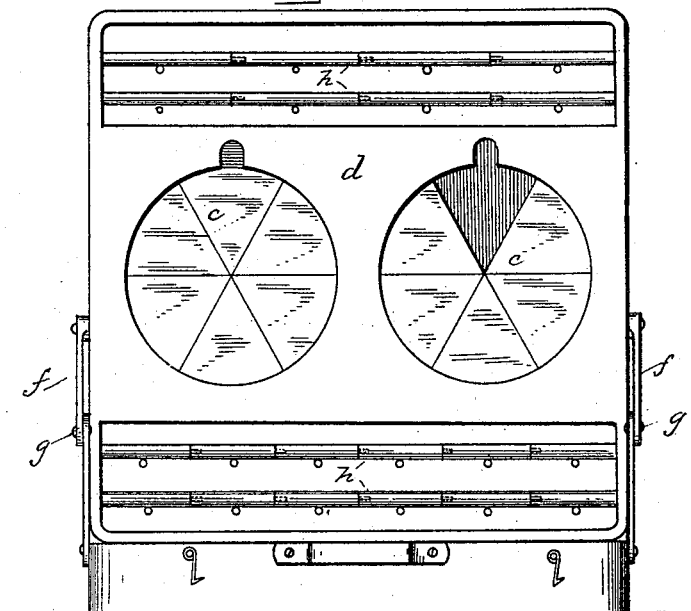

In the drawings hereto annexed, and forming a part of this specification, Figure 1 is a perspective view of the device for holding and exhibiting the sectional disks, representing it as open. Fig. 2 is a front elevation representing sections of disks and blocks as in position in the circular wells or pockets of the exhibitor, showing the manner in which I propose to use my improved contrivance in teaching the science of fractions. Figs. 3 to 12, inclusive, represent disks and blocks divided into independent fractional parts in accordance with my invention.

Similar letters of reference indicate similar parts in all the figures.

In the drawings, $a$ represents the body or base of the receptacle, provided with the wells or pockets $b\ b$ for holding the sectional disks $c\ c$.

To the base $a$, at one side or end thereof, is hinged the lid or exhibitor $d$, provided with recesses $e\ e$ of a form corresponding to the well or pocket $b$, and preferably of a depth sufficient to hold two or more superposed disks, for a purpose hereinafter explained. This lid is also connected to the base by straps $f\ f$, pivoted at one of their ends to the former and at the other to the latter, and hinged at or about their centers, as represented at $g\ g$, the construction and arrangement of these latter instrumentalities being such that when the lid is raised to its utmost limit it will be inclined backwardly from the base, and be supported in this position by the straps $f\ f$, as clearly shown in Fig. 1 of the drawings.

The wells or pockets $b\ b$ in the base are made in a form corresponding to the shape of the sectional disks when the parts of each are so assembled as to form a unit, though such wells are of a size enough larger than the disks to permit the latter to be readily placed therein and removed therefrom.

Apertures or passages $s\ s$, communicating or connecting with the wells $b$, and recesses $e$, to permit the teacher to easily engage or take hold of a section of a disk with a finger of his or her hand and lift it from the well or recess, are formed in the base and lid, as clearly shown in Figs. 1 and 2.

Figure 3:
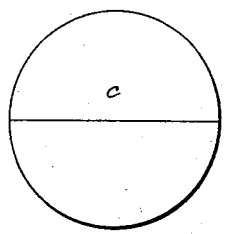
Figure 4:
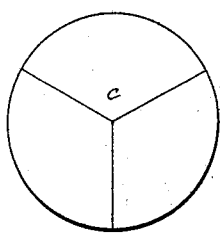
Figure 5:
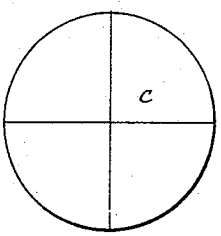
Figure 6:
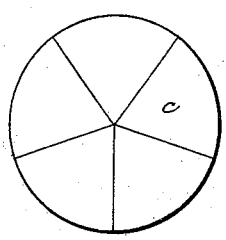
Figure 7:
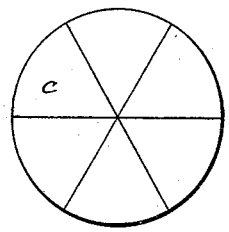
Figure 8:
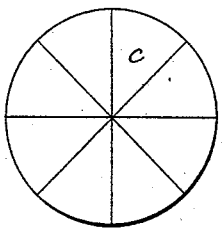
Figure 9:
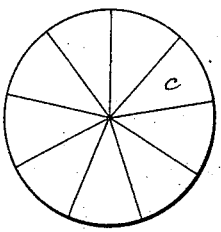
Figure 10:
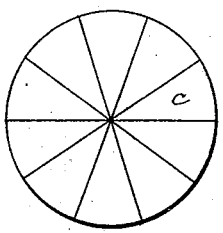
Figure 11:
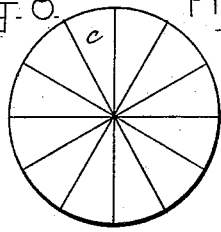
Figure 12:
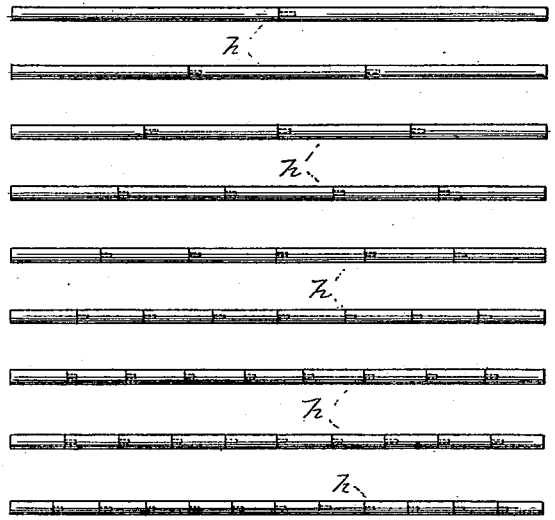

Each disk $c$ is divided into independent equal fractional parts, the first, for instance, into two aliquot parts or halves, as represented in Fig. 3, and the second into three parts or thirds, as shown in Fig. 4, and so on, providing as many disks and dividing them into as many independent parts as may be found desirable or advantageous, the drawings representing ten disks divided into parts ranging from halves to twelfths, omitting sevenths and elevenths.

The manner of using my invention is as follows: I store, for the sake of convenience, in the wells or pockets $b\ b$ of the receptacle $a$ as many and such of the sectional disks as I may desire to use, and with the exhibitor so placed before the scholar or class that it may be fully seen by him or them. I assemble the parts of a disk in the circular recesses or pockets $e$ in such manner to form a unit, said recesses or pockets being preferably deep enough to hold two or more superposed disks, so that the separable and independent fractional parts of one disk may be exhibited and contrasted with those of another or others in the same pocket or recess. It is not essential, however, that the pockets should be deep enough to hold more than one disk at a time, as my invention could be practiced if they were sufficiently deep to hold the several parts of a single disk. It is necessary only that the pockets should be capable of maintaining the parts of a single disk in the form of a whole, or any part of a whole which the fractional parts of a disk are capable of representing, and then in various ways exhibit such parts or any number of them to teach the science of fractions, by showing the equal parts into which a unit may be divided, and the relationship of such parts to the whole, and the relationship of one or more of the equal parts of one unit to one or more parts of another unit divided into a greater or less number of equal parts.

With some students, and under some circumstances, I find it desirable to use blocks of the form shown at $h\,h$, in Figs. 1 and 2, in connection with the sectional disks described. These blocks $h\,h$ are also formed in sections, and the sections are secured or held together, when desired, by means of a hole formed in one end of each block, and a pin fitting closely therein secured to the adjoining end of the adjacent block.

As is seen, my receptacle is calculated to have stored therein the sectional blocks $h\,h$ in addition to the sectional disks, as the exhibitor is designed to display both forms of the devices, either separately or together.

It is obvious that many changes may be made in the form of my receptacle and exhibitor as shown, without departing from the spirit of the invention. For instance, a single well or pocket in the exhibitor would answer the purposes in some cases, while in others it may be found desirable to employ more than two.

I claim—

1. An educational appliance consisting of the combination, with a series of disks, each divided into independent and separable fractional parts, the fractional parts of each being of equal size, of an exhibitor provided with a circular well or pocket of sufficient depth to contain two or more disks, whereby the separate and independent parts of the disks may be readily assembled and held in the form of and to represent a unit or any fractional part of a unit which the fractional parts of the disks are capable of representing and be conveniently displayed before a student or class of students, as set forth.

2. An educational appliance consisting of a series of independent detached disks, each divided into fractional parts, the fractional parts of each being of equal size and adapted to be readily assembled to form a unit, a receptacle having circular wells for holding or storing said sectional disks or blocks, and a cover having circular pockets adapted to exhibit and contain the disks and hold the same in position to form a unit or fractional part of a unit, said wells and pockets being of sufficient depth to hold two or more superposed disks, as set forth.

3. An educational appliance consisting of a series of disks, each divided into fractional parts, the fractional parts of each being of equal size, and adapted to be readily assembled to form a unit, a receptacle provided with wells or pockets $b\,b$, for holding or storing said sectional disks, and an exhibitor, $d$, provided with recesses or pockets $e\,e$, for holding the parts of the disks in position to form a unit or units or parts of a unit or units, said wells or pockets and recesses or pockets being of sufficient depth to hold two or more superposed disks, as set forth.

4. The combination, with the sectional disks $c\,c$, of the base $a$, provided with the wells or pockets $b\,b$, and having the exhibitor $d$ formed as a lid to said base and hinged thereto, said exhibitor being provided with the recesses $e\,e$, said pockets and recesses being of sufficient depth to hold two or more superposed disks, as set forth.

In testimony whereof I have signed my name to this specification, in the presence of two subscribing witnesses, this 2d day of February, 1886.

EDWARD SOUTHWORTH.

Witnesses:
C. F. BROWN,
ARTHUR W. CROSSLEY.